United States Patent [19]
Saito

[11] 3,890,273
[45] June 17, 1975

[54] ANAEROBICALLY CURABLE SEALING COMPOSITION CONTAINING 2,2-BIS(4-ACRYLOXY-ALKOXY PHENYL) PROPANE

[75] Inventor: Tsutomu Saito, Tokyo, Japan
[73] Assignee: Three Bond Co. Ltd., Tokyo, Japan
[22] Filed: Apr. 26, 1974
[21] Appl. No.: 464,343

[30] Foreign Application Priority Data
Dec. 19, 1973  Japan.............................. 48-142652

[52] U.S. Cl...... 260/47 UA; 117/161 UZ; 260/30.2; 260/30.8 R; 260/33.4 P; 260/45.95
[51] Int. Cl.................................................C08f 3/62
[58] Field of Search......... 260/47 UA, 30.8 R, 30.2, 260/33.4 P, 45.95

[56] References Cited
UNITED STATES PATENTS
2,482,706  9/1949  Day.................................... 260/473
3,751,399  8/1973  Lee, Jr., et al................. 260/47 UA
3,766,132  10/1973  Lee, Jr. et al..................... 260/41 A
3,810,938  5/1974  Schmitt et al.................... 260/486 R FOREIGN PATENTS OR APPLICATIONS
15,640  1/1970  Japan.............................. 260/47 UA Primary Examiner—Lester L. Lee
Attorney, Agent, or Firm—Donald D. Mon; D. Gordon Angus

[57] ABSTRACT

An anaerobically curable sealing composition having many kinds of excellent characteristics, such as being harmless to the human body, etc., consisting essentially of 100 parts by weight of a polymeric monomer having the general formula of

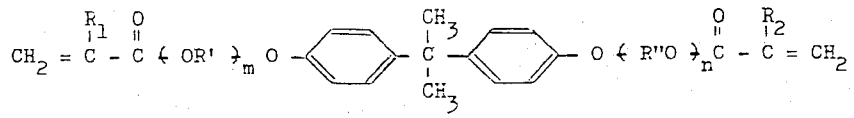

wherein, $R_1$ and $R_2$ represent hydrogen or alkyl radicals, respectively, $R'$ and $R''$ represent alkylene radicals having from 2 to 4 carbon atoms, respectively, and $m$ and $n$ represent, respectively, an integer of from 2 to 8, 0.2 to 3 parts by weight of an organic peroxide, 0.05 to 0.5 part by weight of n-dodecyl mercaptan, 0.2 to 2 parts by weight of O-sulfobenzoic imide, and 0.1 to 1 part by weight of 2,6-di-tert.-butyl p-cresol.

16 Claims, No Drawings

ANAEROBICALLY CURABLE SEALING COMPOSITION CONTAINING 2,2-BIS(4-ACRYLOXY-ALKOXY PHENYL) PROPANE

BACKGROUND OF THE INVENTION

This invention relates to an anaerobically curable sealing composition which possesses many kinds of excellent characteristics.

The expression "anaerobically curable sealing composition" is generally employed to indicate a composition which will not cure and will be kept in liquid state as long as it remains in contact with air or oxygen, while rapidly curing under the exclusion of the air or oxygen between, for example, mating surfaces of interfitting parts (e.g., bolts and nuts) in assembling the parts, providing enhanced engagement between the parts. Thus, the composition is widely utilized as sealing materials, such as loosening prevention materials for the bolts and nuts, adhesives for an engaged portion, and leak-preventing materials for a liquid or gas having a high pressure or high temperature.

The afore-mentioned composition should desirably possess various kinds of preferable characteristics designated as follows, for accomplishing said utilizations.

1. It is harmless to the human body;
2. It is speedy in cure-initiating rate and curing-rate;
3. it is greater in adhesive force after curing, especially, it does not give rise to a decrease of the adhesive force even when it is left standing under the circumstances of a high temperature (about 80° to 100°c) over a long interval;
4. it is excellent in its adhesiveness not only to iron, but also to various kinds of materials, for example, inert metals, such as, zinc, zinc chromate, black iron oxide, brass, aluminum, etc.;
5. it is excellent in storage stability;
6. it has an adequate viscosity to achieve easy and smooth working.

Following compositions have been known and used as anaerobically curable sealing compositions in the art, such as in the U.S. Pat. Nos. 2,628,178, 2,895,950, 3,041,322, 3,043,820, 3,046,262, 3,218,305, 3,435,012, 3,419,512, 3,489,599:

Compositions obtained by using polymeric polyacrylic esters designated by the general formula of

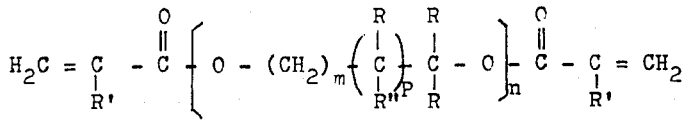

in which, R indicates hydrogen, low alkyl radicals having from 1 to 4 carbon atoms, hydroxyalkyl radicals having from 1 to 4 carbon atoms, or

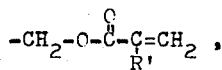

R' indicates hydrogen, halogen, or low alkyl radicals having from 1 to 4 carbon atoms, R'' indicates hydrogen, $$-O-\overset{O}{\overset{\|}{C}}-\underset{R'}{C}=CH_2 ,$$

$m$ is at least equal to 1, for example, 1 to 8 or more, such as, 1 to 4, $n$ is at least equal to 1, for example, 1 to 20 or more, and P indicates 0 or 1, for example, diethylene glycol dimethacrylate, triethylene glycol dimethacrylate, etc.

However, it must be said that said compositions are harmful to the human body for such reasons that it is poisonous to the skin of the human body when contacting with the skin, especially, it is extremely poisonous to the skin of an allergic human body, that is, the skin is extremely poisoned by a slight contact with the composition.

Furthermore, said compositions are poor in adhesiveness against inert metals, and are small in adhesive force after curing. Especially they give rise to a decrease of the adhesive force in the circumstances of a high temperature.

Further, the following anaerobically curable sealing compositions have also been well known in the past: Compositions containing, as one component, trimethylol propane trimethacrylate which is selected from various kinds of monomers proposed in the U.S. Pat Nos. 3,547,851, 3,591,438, 3,625,875, 3,672,942; and compositions containing trimethylolpropane trimethacrylate, which are proposed in the Japanese Pat. No. 704,476.

Both of these known compositions have a disadvantage in that they are slow in curing rate, although slow to act on the skin of the human body.

Furthermore, the following compositions have also been well known in the Japanese Pat. Publication No. 15640/1970, which are anaerobic sealing adhesives comprising a mixture of a compound having the general formula

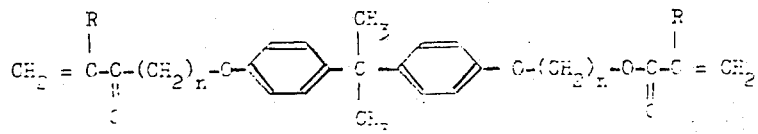

in which, R represents hydrogen, methyl, or ethyl radical, and $n$ represents an integer of from 1 to 8, and organic peroxides.

However, said adhesives have viscosity at a normal temperature, that is, they indicate a viscosity of about 1,000 counterpoises (CPS) at a normal temperature (in the formula, when $n = 1$ or 2, the compound indicates a solid state; melting point being 44°–45°C), thus, it can be said that the adhesives are poor in workability when used in practice. Furthermore, the adhesives also have many disadvantages in that they are deficient in storage stability, slow in curing rate, small in adhesive force after curing, and especially they give rise to an extreme decrease of adhesive force under a condition of high temperature.

SUMMARY OF THE INVENTION

Accordingly, it is an object of this invention to provide an anaerobically curable sealing composition which is harmless to the human body.

Another object of this invention is to provide an anaerobically curable sealing composition which is speedy in cure-initiating rate and curing-rate.

Still another object of this invention is to provide an anaerobically curable sealing composition which is greater in adhesive force after curing, and especially, does not give rise to a decrease of adhesive force even when being left standing under conditions of high temperature (about 80° to 100°C) over a long period of time.

Yet, another object of this invention is to provide an anaerobically curable sealing composition which is excellent in adhesiveness not only to iron, but also to various kinds of materials, for example, inert metals, such as, zinc, zinc chromate, black iron oxide, brass, aluminum, etc.

A still further object of this invention is to provide an anaerobically curable sealing composition which is excellent in storage stability.

A specific object of this invention is to provide an anaerobically curable sealing composition which has a viscosity suitable for easy and smooth working.

According to this invention, these and further objects can be accomplished by providing an anaerobically curable sealing composition consisting essentially of:

100 parts by weight of a polymeric monomer having the general formula of

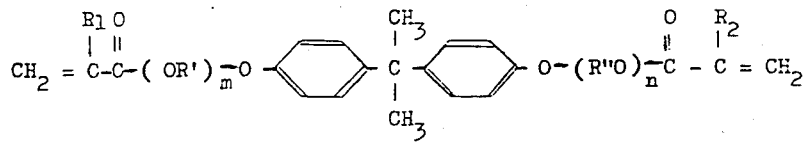

wherein, $R_1$ and $R_2$ respectively represent hydrogen or alkyl radicals, $R'$ and $R''$ represent alkylene radicals having from 2 to 4 carbon atoms, respectively, and $m$ and $n$ respectively indicate an integer of from 2 to 8:

0.2 to 3 parts by weight of an organic peroxide;
0.05 to 0.5 part by weight of n-dodecyl mercaptan;
0.2 to 2 parts by weight of 0-sulfobenzoic imide; and
0.1 to 1 part by weight of 2,6-di-tert.-butyl p-cresol.

These and other objects and advantages of this invention become more apparent and fully understood from the hereinafter detailed description.

DETAILED DESCRIPTION

Among compounds having the general formula mentioned above which are usable according to this invention are: 2,2-bis (4-methacryloxy-di-ethoxy phenyl) propane, 2,2-bis (4-methacryloxy tri-ethoxy phenyl) propane, 2,2-bis (4-methacryloxy tetra-ethoxy phenyl) propane, 2,2-bis (4-methacryloxy penta-ethoxy phenyl) propane, 2,2-bis (4-methacryloxy hexa-ethoxy phenyl) propane, 2,2-bis (4-methacryloxy hepta-ethoxy phenyl) propane, 2,2-bis (4-methacryloxy octa-ethoxy phenyl) propane, 2,2-bis (4-methacryloxy di-propoxy phenyl) propane, 2,2-bis (4-methacryloxy tri-propoxy phenyl) propane, 2,2-bis (4-methacryloxy octa-propoxy phenyl) propane, 2,2-bis (4-methacryloxy di-butoxy phenyl) propene, 2,2-bis (4-methacryloxy tri-butoxy phenyl) propane, 2,2-bis (4-methacryloxy octa-butoxy phenyl) propane, 2,2-bis (4-acryloxy di-ethoxy phenyl) propane, 2,2-bis (4-acryloxy di-butoxy phenyl) propane, 2 (4-methacryloxy di-ethoxy phenyl) - 2 (4-methacryloxy tri-ethoxy phenyl) propane, 2 (4-methacryloxy di-propoxy phenyl) - 2 (4-methacryloxy tri-ethoxy phenyl) propane, 2,2-bis (4-α-ethyl acryloxy di-ethoxy phenyl) propane, 2,2-bis (α-propylacryloxy di-ethoxy phenyl) propane, 2 (4-α-ethyl acryloxy di-ethoxy phenyl) -2 (4-methacryloxy di-ethoxy phenyl) propane, etc..

The afore-designated compounds are preferably pure, but, may be in the industrial quality containing inhibitors, stabilizers, etc., in a very small amount.

Organic peroxides useful in the practice of this invention act as a polymerization initiator, and among these peroxides are benzoyl peroxide, methyl ethyl ketone peroxide, cyclohexanone peroxide, cumene hydroperoxide, di-tertiary butyl peroxide, lauroyl peroxide, dicumyl peroxide, etc..

It is necessary for obtaining the advantages of this invention that these peroxides be used in this invention in an amoount within the range of 0.2 to 3 parts by weight to 100 parts by weight of the aforementioned polymeric monomers. When used in an amount exceeding 3 parts by weight, the compositioon to be obtained becomes more harmful and poisonous to the skin, and does not accomplish the rapid curing, and further, when used in an amount less that 0.2 part by weight, the composition obtained becomes slow in curing rate, especially, in cure-initiating rate.

n-dodecyl mercaptan mentioned above may be used in this invention in an amount within the range of 0.05 to 0.5 part by weight to 100 parts by weight of the aforementioned polymeric monomers for obtaining the advantages of this invention. When used in an amount exceeding 0.5 part by weight, the composition obtained is gelated in a short time during storage, and thus, the composition is deficient in storage stability, and further, when used in an amount less than 0.05 part by weight, the composition obtained becomes slow in curing rate, and especially, in cure-initiating rate, and further, has relatively little adhesive force after curing.

O-sulfobenzoic imide used in the practice of this invention is a compound having the structural formula of

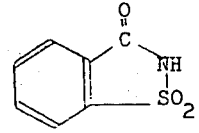

or its sodium salt, and may be used in this invention in an amount within the range of 0.2 to 2 parts by weight to 100 parts by weight of the aforementioned polymeric monomers. When used in an amount exceeding 2 parts by weight, the composition obtained is gelated in a short time during storage, thus, is deficient in storage stability, and further, when used in an amount less than 0.2 part by weight, the composition obtained is extremely slow in curing rate, and it also has extremely low adhesive force after curing.

2,6-di-tertiary butyl p-cresol utilized in this invention is designated by the structural formula

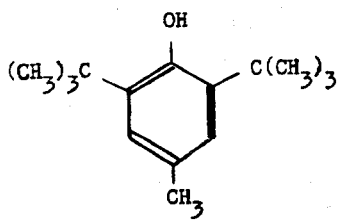

and may be used in this invention in an amount within the range of 0.1 to 1 part by weight to 100 parts by weight of the above-described polymeric monomers. When used in an amount exceeding 1 part by weight, the composition obtained is slow in cure-initiating rate and curing rate, and is low in adhesive force after curing, and furthermore, when used in an amount less than 0.1 part by weight, the composition obtained is deficient in storage stability.

The composition of this invention may be prepared by mixing the aforementioned 5 components to obtain a homogeneous solution, and is preferably prepared by adding to the component of polymeric monomers, another 4 components, that is, organic peroxides, n-dodecyl mercaptan, O-sulfobenzoic imide, and 2,6-di-tertiary butyl p-cresol, and mixing the same. Further, it should be noted that none of the said five components should be omitted.

The following examples are given by way of illustration but are not to be construed to limit the scope of the invention. In these examples, all of the terms "part(s)" are part(s) by weight.

EXAMPLE 1

To each 100 parts of the polymeric monomers described on the following Table I were added, respectively, 0.5 part of cumene hydroperoxide, 0.2 part of n-dodecyl mercaptan, 0.8 part of O-sulfobenzoic imide and 0.5 part of 2,6-di-tertiary butyl p-cresol, and all the components were mixed to obtain a solution thereof, as a result of which, the compositions of this invention were prepared, each being designated as samples No. 1 to 8 in Table I, respectively.

The thus obtained compositions were tested, respectively, to determine cure-initiating time and return torque by using a grease-free bolt three-eighths inch in diameter and a nut of 8 mm in thickness, both being made by iron. The results of the tests were designated on Table I.

The cure-initiating time was determined as follows.

First of all, 10 units of the bolts and nuts were prepared for each composition. Then, each composition was coated on each screw part of the ten nuts, and thereafter, bolts were fixed into each of the coated nuts. (Return torques are zero at this time, respectively.) The thus fixed 10 units of the bolts and nuts were left standing at normal room temperature (20°C). After that, said bolts were returned by fingers to observe resistances felt on the fingers, and at the points that the resistances were felt on the fingers, the times were determined, which were the times taken from the points that the bolts were fixed into the coated nuts to the points that the resistances were felt on the fingers, and, the times determined were averaged, as a result of which, the average obtained was stated as the cure-initiating time.

The return torque was determined as follows.

First of all, ten units of the bolts and nuts were prepared for each composition. Then, each composition was coated on each screw part of the 10 nuts, and after that, the bolts were fixed into each of the coated nuts. The thus fixed 10 units of the bolts and nuts were left standing for 10 minutes at normal temperature (20°C) to cure the coated composition. Thereafter, the aforesaid bolts were returned by using a torque range (produced by Tonichi Manufacturing Co., Ltd. Japan) to determine the values of return torque (Kg-cm), in accordance with the process stated in the Military Specification of U.S.A. (MIL-S-22473D4.6.1.2) then, the values determined were averaged, and the thus obtained average was stated as the return torque.

Furthermore, data on other return torques were determined for different standing times of 30 minutes, 60 minutes, and 24 hours, respectively, at the said normal temperature, and also for 2 days at a temperature of 100°C in the same manner as mentioned above.

Furthermore, the aforementioned compositions were tested to determine storage stabilities and the influences on the skin of the human body. The results of the tests are set forth in Table I.

The storage stability was tested by carrying out the steps of: putting 10 cc, each, of the afore-mentioned compositions into a glass test tube having a diameter of 1.5 cm, and length of 15 cm, corking the tube, maintaining the tube at a temperature of 80°C for 30 minutes, and thereafter, observing the gelation of the composition.

It can be said that if the gelation does not occur after the elapse of 30 minutes at a temperature of 80°C, the composition can be stably stored for 3 months at normal room temperature, which is excellent storage stability.

The influence on the skin of the human body was tested by observing any poisonings appearing on the hands and fingers of a female worker who is in contact with the composition for about 4 hours a day, after the passage of 20 such days from the start of the working.

Table I

| Sample No. | Monomer | Cure-initiating time (min.) | Return torque I (kg-cm) (normal temp: 20°C) | | | | Return torque after being left standing at 100°C for 2 days (kg-cm) | Gelation (at 80°C for 30 minutes) | Influence on the skin (poisoning) |
|---|---|---|---|---|---|---|---|---|---|
| | | | 10 min. | 30 min. | 60 min. | 24 hrs. | | | |
| 1 | 2,2-bis (4-methacryloxy di-ethoxy phenyl) propane | 3 | 50 | 100 | 200 | 350 | 360 | none | none |
| 2 | 2,2-bis(4-methacryloxy tri-ethoxy phenyl) propane | 4 | 49 | 101 | 200 | 352 | 360 | none | none |
| 3 | 2,2-bis(4-methacryloxy tetra-ethoxy phenyl)propane | 3 | 50 | 100 | 201 | 350 | 361 | none | none |
| 4 | 2,2-bis(4-methacryloxy penta-ethoxy phenyl)propane | 3 | 50 | 100 | 200 | 350 | 360 | none | none |

Table I—Continued

| Sample No. | Monomer | Cure-initiating time (min.) | Return torque I (kg-cm) (normal temp: 20°C) | | | | Return torque after being left standing at 100°C for 2 days (kg-cm) | Gelation (at 80°C for 30 minutes) | Influence on the skin (poisoning) |
|---|---|---|---|---|---|---|---|---|---|
| | | | 10 min. | 30 min. | 60 min. | 24 hrs. | | | |
| 5 | 2,2-bis(4-methacryloxy hexa-ethoxy phenyl) propane | 4 | 51 | 103 | 205 | 351 | 358 | none | none |
| 6 | 2,2-bis(4-methacryloxy di-propoxy phenyl) propane | 3 | 50 | 101 | 201 | 351 | 361 | none | none |
| 7 | 2,2-bis(4-methacryloxy di-butoxy phenyl) propane | 3 | 52 | 103 | 200 | 355 | 360 | none | none |
| 8 | 2(4-methacryloxy di-ethoxy phenyl)-2(4-methacryloxy tri-ethoxy phenyl) propane | 3 | 50 | 100 | 203 | 351 | 363 | none | none |

The results indicated on Table I were illustrated, for example, with sample No. 1 as follows. When the nut was returned by fingers, the resistance was felt on the fingers after being left standing for 3 minutes from the point that the bolt was fixed into the nut at a normal temperature. This fact indicates that the composition of sample No. 1 commences cure-initiating after the lapse of 3 minutes. Thus, it can be said that the composition is speedy in cure-initiating rate. Furthermore, return torques of 50, 100, 200, and 350 (kg-cm) resulted after being left standing for 10 minutes, 30 minutes, 60 minutes, and 24 hours, respectively, at normal room temperature. This fact indicates that the composition is speedy in curing rate and further, has great adhesive force after curing. After being left standing at a temperature of 100°C for two days, the resulting return torque was determined as being 360 kg-cm. This means that the composition does not give rise to a decrease of its adhesive force even if it is left standing at a high temperature for a long time. Moreover, gelation did not occur even if the composition was left standing at a temperature of 80°C for 30 minutes. This fact indicates that the composition can be stably put into storage for more than 3 months, thus, is excellent in storage stability. Furthermore, the test for poisoning was carried out in such a manner as to determine whether or not the hands or fingers of the worker were poisoned by the composition. However, no poisoning was observed at all. It can be said from this fact that the composition is quite harmless to the skin.

Moreover, it is obvious from Table I that the experimental data as to samples No. 2–8 are almost the same as the results of sample No. 1, and thus, it can be said that each of the compositions of samples No. 2 to 8 is also as excellent as sample No. 1 with respect to all of these characteristics.

Incidentally, all of the viscosities of samples No. 1 to 8 were found to be within the range of 200 to 450 CPS, and thus, they were all, easily worked when coated on the screws of the nuts.

Moreover, the following experiment was carried out. Grease-free bolts having a diameter of three-eighths inch, and nuts having a thickness of 8 mm, made of the materials indicated in Table II, respectively were prepared. Then, the composition of Sample No. 1 was coated on the screws of the nuts, and the bolts were fixed into the nuts, respectively in the same manner as mentioned above. After that, the composition was tested to determine cure-initiating time and return torque (normal temperature, and also 100°C) in the same manner as described above. The results were as indicated in Table II.

Table II

| Material of bolt and nut | Cure-initiating time (min.) | Return torque (kg-cm) (normal temp: 20°C) | | | | Return torque in the circumstances of 100°C after being left standing for 2 days (kg-cm) |
|---|---|---|---|---|---|---|
| | | 10 min. | 30 min. | 60 min. | 24 hrs. | |
| zinc | 10 | 10 | 60 | 100 | 350 | 360 |
| zinc chromate | 10 | 10 | 60 | 100 | 350 | 360 |
| black-iron oxide | 3 | 40 | 90 | 200 | 350 | 360 |
| aluminum | 3 | 40 | 100 | 200 | 350 | 360 |
| brass | 3 | 30 | 70 | 180 | 300 | 360 |

It becomes apparent from Table II that even if the bolts and nuts, which are respectively made of inert metals, such as zinc, zinc chromate, black iron oxide, aluminum, and brass, are used for test other than an iron material, the composition indicates excellent cure-initiating times, curing rates, and return torques (at normal room temperature, and also at 100°C) which are respectively similar to the ones obtained from iron. It is apparent from the aforementioned results that the composition of this invention has an excellent adhesiveness not only against iron but also the inert metals.

EXAMPLE 2

To 100 parts of 2,2-bis(4-methacryloxy di-ethoxy phenyl) propane were added, respectively, 0.2 part of n-dodecyl mercaptan, 0.8 part of O-sulfobenzoic imide, and 0.5 part of 2,6-di-tertiary butyl p-cresol, then, the thus added components were mixed to obtain the solution thereof. Seven pieces of the thus obtained solution were prepared for testing. After that, to each of the afore-mentioned solutions were added, each, 0.5 part of organic peroxides indicated in Table III, respectively, and said solutions were mixed to obtain the compositions of samples No. 9 to 15 of this invention, respectively.

The thus obtained compositions were tested, respectively, to determine cure-initiating time, and return torque (normal room temperature and also 100°C) by using bolts and nuts made by iron in the same manner as mentioned in Example 1, and further, were observed with respect to the occurrence of gelation in the same manner as mentioned in Example I. The results are set forth in Table III.

It becomes apparent from Table IV that when the amount of cumene hydroperoxide exceeds 3 parts in the composition of this invention, the compositon to be obtained becomes poisonous to the skin, and slow in curing rate as evident from sample No. 22, and when Table III

| Sample No. | Organic peroxides | Cure -initiating time (min.) | Return torque (kg-cm) (normal temp: 20°C) | | | | Return torque after being left in standing at 100°C for 2 days (kg-cm) | Gelation (at 80°C for 30 minutes) |
| --- | --- | --- | --- | --- | --- | --- | --- | --- |
| | | | 10 min. | 30 min. | 60 min. | 24 hrs. | | |
| 9 | benzoil peroxide | 2 | 60 | 120 | 250 | 350 | 360 | none |
| 10 | methyl ethyl ketone peroxide | 2 | 60 | 120 | 230 | 350 | 360 | none |
| 11 | cyclohexanone peroxide | 5 | 40 | 80 | 180 | 350 | 360 | none |
| 12 | cumene hydroperoxide | 3 | 50 | 100 | 200 | 350 | 360 | none |
| 13 | di-tert.-butyl peroxide | 3 | 50 | 100 | 200 | 350 | 360 | none |
| 14 | lauroyl peroxide | 3 | 10 | 50 | 100 | 350 | 360 | none |
| 15 | di-cumyl peroxide | 7 | 10 | 60 | 110 | 350 | 360 | none |

It is obvious from Table III that all of the obtained compositions indicate, respectively, an excellent cure-initiating time, curing-rate, and return torque (normal temperature and also 100°C), even if they contain any kind of organic peroxides therein, and thus, all of said compositions are excellent in storage stability.

Further, it can be said from the afore-mentioned results that it is possible to use any kind of organic peroxides in the compositions of this invention.

EXAMPLE 3

To 100 parts of 2,2-bis (4-methacryloxy di-ethoxy phenyl) propane were added, respectively, 0.2 part of n-dodecyl mercaptan, 0.8 part of O-sulfobenzoic imide, and 0.5 part of 2,6-di-tertiary butyl p-cresol, then, the thus added components were mixed to obtain the solution thereof. Seven portions of the thus obtained solution were prepared for testing. Thereafter, to each of the afore-mentioned portions were added, respectively, 0, 0.1, 0.2, 0.5, 1.5, 3, and 5 part or parts of cumene hydro-peroxide, and the respective solutions obtained after mixing these respective parts of cumene hydro-peroxide were the compositions of samples No. 16 to 22.

The thus obtained compositions were tested, respectively, to determine cure-initiating time, and return torque (at normal temperature, and at 100°C) by using bolts and nuts made by iron in the same manner as mentioned in Example I, and further, were observed respectively with respect to the occurrence of gelation and the influence on the skin in the same manner as mentioned in Example I.

the amount thereo is less than 0.2 part or equal to zero, the composition obtained becomes slow in curing rate, especially, in cure-initiating rate as evident from samples No. 16 and 17. On the contrary, however, when the amount is within the range of 0.2 to 3 parts, preferably, within the range of 0.5 to 1.5 part, the composition obtained indicates excellent cure-initiating time, curing rate, and return torque (at normal temperature and at 100°C), and does not cause gelation even after being left standing for 30 minutes at a temperature of 80°C as evident from samples No. 18 to 21. Thereby, it can be said that it is excellent in storage stability, and is almost harmless on the skin of the human body.

Further, it becomes also apparent from Table IV that when the amount of cumene hydroperoxide is equal to 0.5 part, the composition obtained gives most excellent results with respect to all of the characteristics.

It can be said from the afore-mentioned results that the most suitable amount of organic peroxides utilized in the composition of this invention may be within the range of 0.2 to 3 parts to 100 parts of the polymeric monomers used in the composition.

EXAMPLE 4

To 100 parts of 2,2-bis (4-methacryloxy di-ethoxy phenyl) propane were added, respectively, 0.5 part of cumene hydroperoxide, 0.8 part of O-sulfobenzoic imide, and 0.5 part of 2,6-di-tertiary butyl p-cresol, then, the thus added components were mixed to obtain the solution thereof. Seven of the thus obtained solution were prepared for testing.

Table IV

| Sample No. | The amount of cumene hydroperoxide (part: to 100 parts of polymeric monomer) | Cure -initiating time (min.) | Return torque (kg-cm) (normal temp: 20°C) | | | | Return torque after being left standing at 100°C for 2 days (kg-cm) | Gelation (at 80°C for 30 minutes) | Influence on the skin (poisoning) |
| --- | --- | --- | --- | --- | --- | --- | --- | --- | --- |
| | | | 10 min. | 30 min. | 60 min. | 24 hrs. | | | |
| 16 | 0 | 30 | 0 | 10 | 30 | 120 | 280 | none | none |
| 17 | 0.1 | 20 | 0 | 10 | 50 | 150 | 300 | none | none |
| 18 | 0.2 | 10 | 10 | 40 | 80 | 350 | 360 | none | none |
| 19 | 0.5 | 3 | 50 | 100 | 200 | 350 | 360 | none | none |
| 20 | 1.5 | 5 | 40 | 100 | 180 | 350 | 360 | none | none |
| 21 | 3 | 15 | 0 | 20 | 150 | 340 | 360 | none | none(a slight poisoning on diatheses) |
| 22 | 5 | 20 | 0 | 5 | 80 | 320 | 340 | none | poisoning |

Thereafter, to each of the afore-mentioned portions were added, respectively, 0, 0.02, 0.05, 0.1, 0.2, 0.5 and 0.8 part of n-dodecyl mercaptan; then, the respective solutions obtained after mixing these respective parts of n-dodecyl mercaptan were the compositions of samples No. 23 to 29.

The thus obtained compositions were tested, respectively, to determine cure-initiating time, and return torque (at normal temperature and at 100°C) by using bolts and nuts made by iron in the same manner as mentioned in Example 1, and further, were observed with respect to the gelations in the same manner as described in Example 1.

The results are set forth in Table V.

It can be said from the afore-mentioned results that the most suitable amount of n-dodecyl mercaptan utilized in the composition of this invention may be within the range of 0.05 to 0.5 part to 100 parts of the polymeric monomers used in the composition.

EXAMPLE 5

To 100 parts of 2,2-bis (4-methacryloxy di-ethoxy phenyl) propane were added, respectively, 0.5 part of cumene hydroperoxide, 0.2 part of n-dodecyl mercaptan and 0.5 part of 2,6-di-tertiary butyl p-cresol, then, the thus added components were mixed to obtain the solution thereof. Nine portions of the thus obtained solution were prepared for testing.

Table V

| Sample No. | The amount of n-dodecyl mercaptan (part: to 100 parts of polymeric monomer) | Cure-initiating time (min.) | Return torque (kg-cm) (normal temp: 20°C) 10 min. | 30 min. | 60 min. | 24 hrs. | Return torque after being left standing at 100°C for 2 days (kg-cm) | Galation (at 80°C) for 30 minutes) |
|---|---|---|---|---|---|---|---|---|
| 23 | 0 | 1400 | 0 | 0 | 0 | 10 | 80 | none |
| 24 | 0.02 | 60 | 0 | 0 | 10 | 200 | 250 | none |
| 25 | 0.05 | 15 | 0 | 30 | 100 | 320 | 340 | none |
| 26 | 0.1 | 5 | 20 | 80 | 170 | 350 | 360 | none |
| 27 | 0.2 | 3 | 50 | 100 | 200 | 350 | 360 | none |
| 28 | 0.5 | 3 | 70 | 130 | 250 | 350 | 360 | none |
| 29 | 0.8 | 3 | 80 | 150 | 270 | 350 | 360 | gelation |

It becomes evident from Table V that when the amount of n-dodecyl mercaptan exceeds 0.5 part in the composition, the composition to be obtained is gelated within 30 minutes at a temperature of 80°C as is apparent from sample No. 29, thus, it can be said that the composition is deficient in storage stability, and when the amount is less than 0.05 part, the composition being obtained is slow in curing rate, especially, in cure-initiating rate, and moreover is low in adhesive force after curing, as evident from sample No. 24; and furthermore, when the amount is equal to zero, the composition obtained scarcely cures as is evident from sample No. 23. On the contrary, however, when the amount is within the range of 0.05 to 0.5 part, preferably, within the range of 0.1 to 0.5 part, the composition obtained has excellent cure-initiating time, curing rate, and return torque (normal temperature, and 100°C), and is excellent in storage stability as is apparent from samples No. 25 to 28, and especially, when the amount is equal to 0.2 part, the compositon obtained gives most excellent results with respect to all of the characteristics.

Thereafter, to each of the portions were added, respectively, 0, 0.1, 0.2, 0.5, 0.8, 1.0, 1.5, 2.0, and 2.5 parts of O-sulfobenzoic imide, then, said solutions with these respective additions were stirred to obtain the compositions of samples No. 30 to 38.

The thus obtained compositions were tested, respectively, to determine cure-initiating time, and return torque (normal temperature and 100°C) by using bolts and nuts made by iron in the same manner as mentioned in Example 1, and further, were observed with respect to the gelation in the same manner as described in Example 1.

The results are set forth in Table VI.

Table VI

| Sample No. | The amount of .0-sulfobenzoic amide (part: to 100 parts of polymeric monomer) | Cure-initiating time (min.) | Return torque (kg-cm) (normal temp: 20°C) 10 min. | 30 min. | 60 min. | 24 hrs. | Return torque after being left standing at 100°C for 2 days (kg-cm) | Gelation (at 80°C for 30 minutes) |
|---|---|---|---|---|---|---|---|---|
| 30 | 0 | 1400 | 0 | 0 | 0 | 10 | 80 | none |
| 31 | 0.1 | 60 | 0 | 0 | 10 | 180 | 240 | none |
| 32 | 0.2 | 20 | 0 | 20 | 80 | 300 | 340 | none |
| 33 | 0.5 | 7 | 20 | 60 | 160 | 340 | 360 | none |
| 34 | 0.8 | 5 | 40 | 90 | 190 | 350 | 360 | none |
| 35 | 1.0 | 3 | 50 | 100 | 200 | 350 | 360 | none |
| 36 | 1.5 | 3 | 50 | 100 | 200 | 350 | 360 | none |
| 37 | 2 | 3 | 50 | 100 | 200 | 350 | 360 | none |
| 38 | 2.5 | 3 | 50 | 100 | 200 | 350 | 360 | gelation |

It becomes apparent from Table VI that when the amount of O-sulfobenzoic amide exceeds 2 parts in the composition, the composition to be obtained is gelated within 30 minutes at a temperature of 80°C as is obvious from sample No. 38; thereby, it can be said that the composition is deficient in storage stability. When the amount is less than 0.2 part, the composition obtained is slow in curing rate, especially, in cure-initiating rate, and is low in adhesive force after curing, as is evident from sample No. 31, and moreover, when the amount is equal to zero, the composition obtained scarcely cures as is apparent from sample No. 30. On the contrary, however, when the amount is within the range of 0.2 to 2 parts, preferably within the range of 0.8 to 1.5 part, the compositions obtained indicate excellent cure-initiating time, curing rate, and return torque (normal temperature, and 100°C), and are excellent in storage stability as is apparent from samples No. 32 to 37, and especially, when the amount is equal to 0.8 part, the composition obtained gives most excellent results with respect to all of the characteristics.

It can be said from the afore-described results that the most suitable amount of O-sulfobenzoic imide utilized in the composition of this invention may be within the range of 0.2 to 2 parts to 100 parts of the polymeric monomers used in the composition.

EXAMPLE 6

To 100 parts of 2,2-bis (4-methacryloxy di-ethoxy phenyl) propane were added, respectively, 0.5 part of cumene hydroperoxide, 0.2 part of n-dodecyl mercaptan and 0.8 part of O-sulfobenzoic imide, and then, the thus added components were mixed to obtain the solution thereof. Eight portions of the thus obtained solution were prepared for testing.

Thereafter, to each of the portions were added, respectively, 0, 0.05, 0.1, 0.3, 0.5, 0.8, 1.0, and 1.5 of 2,6-di-tertiary butyl p-cresol, then, the solutions with there respective additions were stirred to obtain the compositions of samples No. 39 to 46.

The thus obtained compositions were tested, respectively, to determine cure-initiating time, and return torque (normal temperature and 100°C) by using bolts and nuts made by iron in the same manner as mentioned in Example 1, and further, were observed with respect to the gelation in the same manner as described in Example 1.

The results are set forth in Table VII.

tained is gelated within 30 minutes at a temperature of 80°C, and thus, is inferior in storage stability as evident from samples No. 39 to 40. On the contrary, however, when the amount is within the range of 0.1 to 1 part, preferably, within the range of 0.3 to 0.8 part, the compositions obtained have excellent cure-initiating time, curing rate, and return torque (normal temperature, and 100°C), and are excellent in storage stability as is apparent from samples No. 41 to 45, and especially, when the amount is equal to 0.5 part, the composition obtained gives most excellent results with respect to all of the characteristics.

It can be said from said results that the most suitable amount of 2,6-di-tertiary butyl p-cresol utilized in the composition of this invention is within the range of 0.1 to 1 part to 100 parts of the polymeric monomers used in the composition.

I claim:

1. An anaerobically curable sealing composition consisting essentially of 100 parts by weight of a polymeric monomer having the general formula of

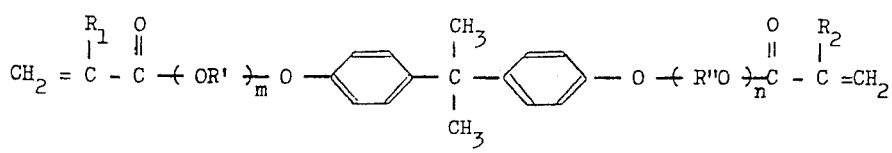

wherein, $R_1$ and $R_2$ represent hydrogen or alkyl radicals, respectively, $R'$ and $R''$ represent alkylene radicals having from 2 to 4 carbon atoms, respectively, and m and n represent, respectively, an integer of from 2 to 8, 0.2 to 3 parts by weight of an organic peroxide, 0.05 to 0.5 part by weight of n-dodecyl mercaptan, 0.2 to 2 parts by weight of O-sulfobenzoic imide, and 0.1 to 1 part by weight of 2,6-di-tertiary butyl p-cresol.

2. The composition as claimed in claim 1 wherein said polymeric monomer is 2,2-bis(4-methacryloxy di-ethoxy phenyl) propane.

3. The composition as claimed in claim 1 wherein said polymeric monomer is 2,2-bis (4-methacryloxy di-propoxy phenyl) propane.

4. The composition as claimed in claim 1 wherein said polymeric monomer is 2,2-bis (4-methacryloxy di-butoxy phenyl) propane.

5. The composition as claimed in claim 1 wherein

Table VII

| Sample No. | The amount of 2,6-di-tert-butyl p-cresol part: to 100 parts of polymeric monomer) | Cure -initiating time (min.) | Return torque (kg-cm) (normal temp: 20°C) | | | Return torque after being left stand-ing at 100°C for 2 days (kg-cm) | Gelation (at 80°C for 30 minutes) |
|---|---|---|---|---|---|---|---|
| | | | 10 min. | 30 min. | 60 min. | 24 hrs. | |
| 39 | 0 | 2 | 60 | 120 | 250 | 350 | 360 | gelation |
| 40 | 0.05 | 3 | 50 | 110 | 230 | 350 | 360 | gelation |
| 41 | 0.1 | 3 | 50 | 110 | 220 | 350 | 360 | none |
| 42 | 0.3 | 3 | 50 | 100 | 210 | 350 | 360 | none |
| 43 | 0.5 | 3 | 50 | 100 | 200 | 350 | 360 | none |
| 44 | 0.8 | 7 | 10 | 80 | 130 | 350 | 360 | none |
| 45 | 1 | 15 | 0 | 30 | 90 | 340 | 360 | none |
| 46 | 1.5 | 30 | 0 | 10 | 30 | 320 | 340 | none |

It becomes apparent from Table VII that when the amount of 2,6-di-tertiary butyl p-cresol exceeds 1 part in the composition, the composition obtained becomes slow in cure-initiating rate, and curing rate, and low in adhesive force after curing, and when the amount is less than 0.1 part or equal to zero, the composition obsaid polymeric monomer is 2 (4-methacryloxy di-ethoxy phenyl)-2(4-methacryloxy triethoxy phenyl) propane.

6. The composition as claimed in claim 1 wherein said polymeric monomer is selected from the group consisting of 2,2-bis (4-methacryloxy tri-ethoxy phenyl) propane, 2,2-bis (4-methacryloxy tetra-ethoxy phenyl) propane, 2,2-bis (4-methacryloxy penta-ethoxy phenyl) propane, and 2,2-bis (4-methacryloxy hexa-ethoxy phenyl) propane.

7. The composition as claimed in claim 1 wherein said organic peroxide is cumene hydroperoxide.

8. The composition as claimed in claim 1 wherein said organic peroxide is selected from the group consisting of benzoyl peroxide, methyl ethyl ketone peroxide, cyclohexanone peroxide, di-tert.-butyl peroxide, lauroyl peroxide and di-cumyl peroxide.

9. The composition as claimed in claim 1 wherein the amount of said organic peroxide is within the range of 0.5 to 1.5 part by weight.

10. The composition as claimed in claim 1 wherein the amount of said organic peroxide is equal to 0.5 part by weight.

11. The composition as claimed in claim 1 wherein the amount of said n-dodecyl mercaptan is within the range of 0.1 to 0.5 part by weight.

12. The composition as claimed in claim 1 wherein the amount of said n-dodecyl mercaptan is equal to 0.2 part by weight.

13. The composition as claimed in claim 1 wherein the amount of said O-sulfobenzoic imide is within the range of 0.8 to 1.5 part by weight.

14. The composition as claimed in claim 1 wherein the amount of said O-sulfobenzoic imide is equal to 0.8 part by weight.

15. The composition as claimed in claim 1 wherein the amount of said 2,6-dieteriary butyl p-cresol is within the range of 0.3 to 0.8 part by weight.

16. The composition as claimed in claim 1 wherein the amount of said 2,6-di-tertiary butyl p-cresol is equal to 0.5 part by weight.

* * * * *